United States Patent
Hartmann et al.

(10) Patent No.: US 10,591,350 B2
(45) Date of Patent: Mar. 17, 2020

(54) DEVICE FOR MEASURING THE FREQUENCY OF VIBRATIONS ON A TIGHT DRIVE BELT AND A METHOD FOR CARRYING OUT THE VIBRATION FREQUENCY MEASUREMENT

(71) Applicant: Juergen Hartmann, Sigmarszell (DE)

(72) Inventors: Juergen Hartmann, Sigmarszell (DE); Jochen Kuhn, Oberaudorf (DE)

(73) Assignee: Juergen Hartmann, Sigmarszell (DE)

( * ) Notice: Subject to any disclaimer, the term of this patent is extended or adjusted under 35 U.S.C. 154(b) by 400 days.

(21) Appl. No.: 15/303,341

(22) PCT Filed: Mar. 28, 2015

(86) PCT No.: PCT/EP2015/000668
§ 371 (c)(1),
(2) Date: Oct. 11, 2016

(87) PCT Pub. No.: WO2015/154857
PCT Pub. Date: Oct. 15, 2015

(65) Prior Publication Data
US 2017/0038245 A1    Feb. 9, 2017

(30) Foreign Application Priority Data

Apr. 8, 2014  (DE) .................. 10 2014 005 107

(51) Int. Cl.
*G01H 9/00*    (2006.01)
*G01S 7/40*    (2006.01)
(Continued)

(52) U.S. Cl.
CPC ................ *G01H 9/00* (2013.01); *G01S 7/40* (2013.01); *G01S 13/50* (2013.01); *G01S 13/86* (2013.01); *G01S 13/88* (2013.01)

(58) Field of Classification Search
CPC .. G01H 9/00; G01S 7/40; G01S 13/50; G01S 13/86; G01S 13/88
(Continued)

(56) References Cited

U.S. PATENT DOCUMENTS

| 5,828,331 A | 10/1998 | Harper |
| 2003/0058158 A1 | 3/2003 | Smith et al. |

(Continued)

FOREIGN PATENT DOCUMENTS

| DE | 4235072 A1 | 4/1994 |
| DE | 19728653 A1 | 1/1999 |

(Continued)

*Primary Examiner* — Frank J McGue
(74) *Attorney, Agent, or Firm* — Browdy and Neimark, P.L.L.C.

(57) ABSTRACT

Device (1) for manually measuring the frequency of vibrations on a tight drive belt (6, 6', 6"), comprising a Doppler radar module (3) which uses a transmit antenna (4) for emitting a transmit beam (8) onto a vibrating surface of the drive belt (6, 6', 6") as well as a receive antenna (5) for receiving the receive beam (9) reflected by the surface and evaluates the receive beam (9) according to the Doppler principle, the vibration sensor (1) also comprising an acceleration sensor (10) in addition to the Doppler radar module (3), the signals of the acceleration sensor (10) being calculated along with the signals of the Doppler radar module, thus allowing some signals to be disregarded.

9 Claims, 6 Drawing Sheets

(51) Int. Cl.
  *G01S 13/50*  (2006.01)
  *G01S 13/86*  (2006.01)
  *G01S 13/88*  (2006.01)

(58) Field of Classification Search
  USPC .......................................................... 342/52
  See application file for complete search history.

(56)  References Cited

U.S. PATENT DOCUMENTS

2010/0021151 A1\*  1/2010  Nubling ................ G03B 15/03
  396/61
  2012/0031187 A1  2/2012  Bohn et al.

FOREIGN PATENT DOCUMENTS

| | | |
  |---|---|---|
  | EP | 0316888 A1 | 5/1989 |
  | GB | 2310099 A | 8/1997 |
  | JP | 6444808 A | 2/1989 |
  | JP | 04195127 A | 7/1992 |
  | JP | 10153479 A | 6/1998 |
  | JP | 11223550 A | 8/1999 |
  | JP | 2000329549 A | 11/2000 |
  | JP | 2014052280 A | 3/2014 |

\* cited by examiner

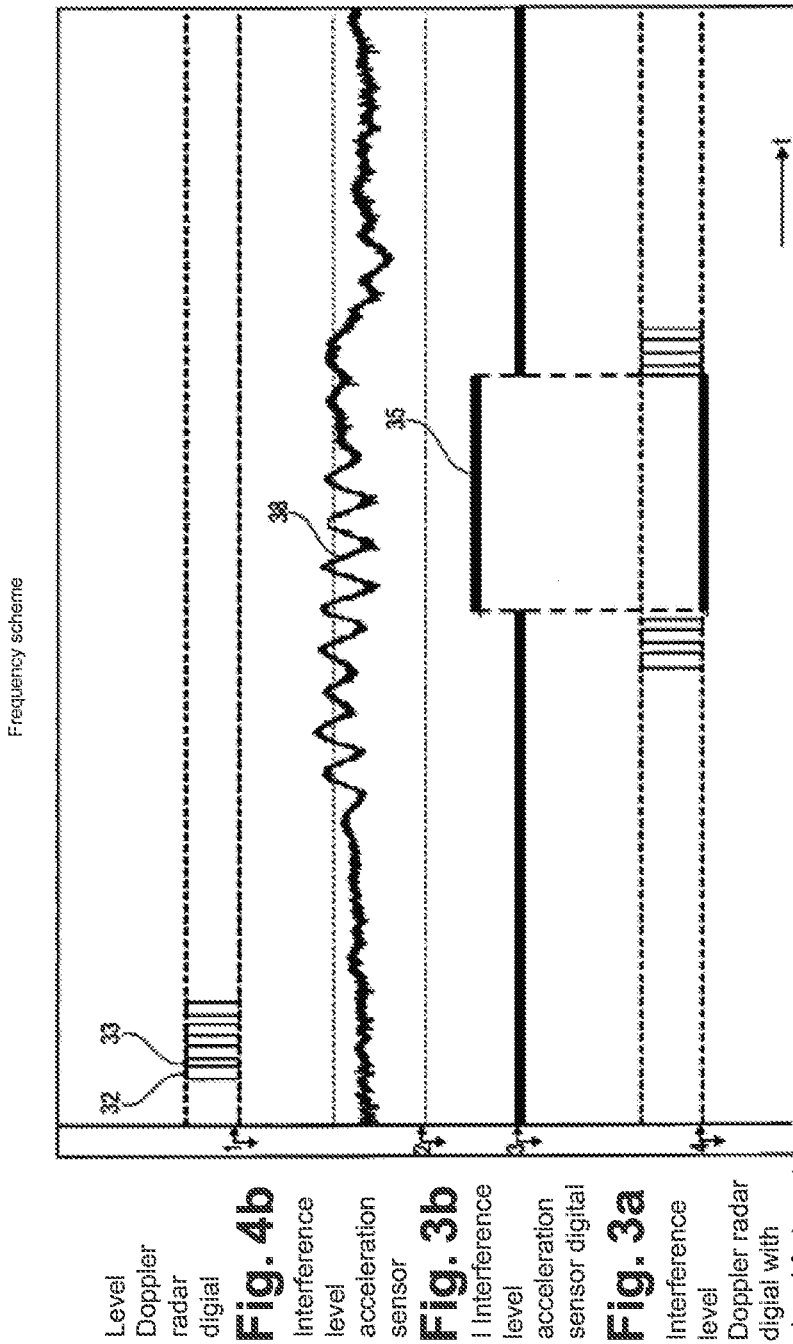

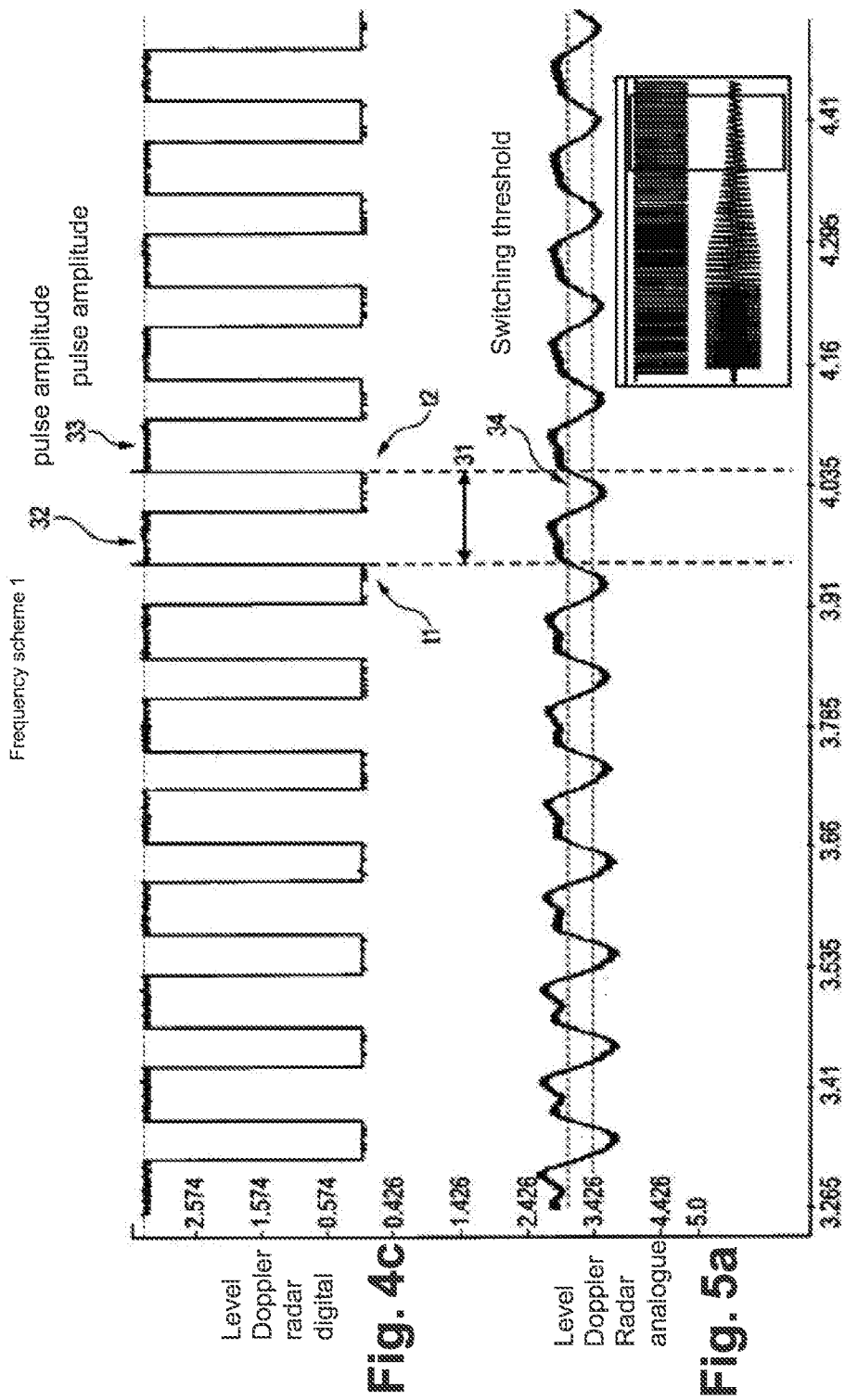

DEVICE FOR MEASURING THE FREQUENCY OF VIBRATIONS ON A TIGHT DRIVE BELT AND A METHOD FOR CARRYING OUT THE VIBRATION FREQUENCY MEASUREMENT

The invention relates to a device for measuring the frequency of vibrations on a tight drive belt and a method for operating the device and for carrying out the vibration frequency measurement.

Vibration frequency measurements on tight drive belts are known. For example, GB 2 310 099 A proposes the use of a so-called Doppler radar that transmits a microwave beam using a transmit antenna against a vibrating surface and receives the signal using a receive antenna and evaluates it according to the Doppler principle.

However, the drawback of this known vibration measurement by means of a Doppler radar is that a movement of the hand-held measuring head during the performance of the vibration measurement is not included in the measurement result. Therefore, such a measurement has errors and is not sufficiently accurate if the measuring head is moved during the measurement.

The same drawback also applies to DE 197 28 653 A1, which uses a CW Doppler radar module, wherein the module is a microwave radiator and a receiver operating in the wavelength range of several centimeters up to several millimeters.

Here, too, the problem exists that the movement of the measuring head by hand is not taken into account during the performance of the measurement on tight drive belts.

It is therefore the object of the invention to develop a vibration sensor for the measurement of vibrations on tight drive belts of the type mentioned in the beginning in such a way that not even a hand-held measurement of the vibration sensor will cause any erroneous measurement results.

Further, the invention is based on the object of proposing a method for evaluating the signals of the vibration sensor, wherein a substantially more accurate evaluation of the signals sensed by the vibration sensor becomes possible.

For achieving the mentioned object, a vibration sensor according to the invention is characterized by the technical teaching of claim 1.

A method for evaluating the signals of the vibration sensor is characterized by the features of independent claim 6.

An essential feature of the vibration sensor according to the invention is that in a vibration sensor that is hand-held, apart from a Doppler radar module, an acceleration sensor is additionally provided, and that the signals of the Doppler radar are offset against those of the acceleration sensor in terms of some signals being disregarded.

According to the technical teaching of independent claim 6, the method for evaluating the signals of a vibration sensor are characterized in that from the analogue level of the Doppler radar module, by using a switching threshold, digital pulses that are temporally offset relative to each other are derived, the mutual distance of which is a measure of the time of the incoming impulses, and from this, the frequency of the vibrating drive belt assembly can be derived.

In case a movement of a predefined amplitude and a predefined speed is detected by the acceleration sensor during the measurement, the pulse of the Doppler radar sensor is disregarded, because this shows that the hand-held vibration sensor has been briefly moved during the measurement. The movement is therefore sensed by the acceleration sensor and the pulse of the acceleration sensor that is derived therefrom is used during the determination of the digital Doppler radar pulses in such a way that any Doppler radar impulses generated during the acceleration phase are disregarded.

Such a method, wherein the Doppler radar impulses are compared with the pulses of the acceleration sensor, has so far not been known. As a result, a so far unknown level of accuracy and security during the evaluation of a vibration measurement on a vibrating drive belt is achieved, wherein the vibration sensor is hand-held.

The mentioned results of the measurement on the acceleration sensor are therefore offset against each other and are used for evaluating the Doppler radar pulses.

Therefore, apart from the Doppler radar module, the vibration sensor is additionally provided with an acceleration sensor, the signals of which can be offset against the signals of the Doppler radar module, so that some signals may be disregarded.

According to a further feature of the invention, an optical positioning aid for the hand-held positioning of the vibration sensor over the vibrating surface of the belt is provided. To this end it is provided that on the bottom surface of the housing, in the rear region of the housing, approximately in the location where the cable passes into the housing, two LEDs located at a distance from each other are provided, which project two light beams intersecting on the surface of the belt downwards and forwards at an angle against the surface of the belt to be detected.

Accordingly, the two LEDs each generate a light beam and the two light beams overlap on the surface of the belt to be detected, if the correct distance between the measuring head and the belt was adjusted by hand. In order to refine the optical positioning aid it is provided that the two LEDs additionally generate in the projected light beams smaller marking points that are centrally projected in the light beams.

The correct distance between the bottom surface of the vibration sensor and the surface of the belt is achieved once the two marking points centrally projected in the light beams at an angle onto the surface of the belt overlap with each other on the belt surface.

Such an overlap is achieved e.g. at a distance of the bottom surface of the measuring head of 40 mm above the surface of the belt. By means of this optical positioning aid, the advantage is achieved that a constant distance from the surface of the belt that is to be measured is achieved, which so far has not been the case.

The invention deliberately goes without a contactless measurement of the distance which would also be possible using a (ultrasound or photo-optical) distance sensor, since for a hand-held distance adjustment, the optical positioning aid does not need any excessive wiring and operates with a high level of operational safety.

Thus, the optimal distance can be constantly maintained by keeping the vibration sensor in the hand and can also be optically monitored during the entire measurement.

The direction of the light beams generated by the LEDs is oriented in such a way that the overlap of the light beams and thus the adjustment of the optimum measurement distance are achieved directly below the measuring field of the measuring head on the bottom surface of the vibration sensor.

In this way it is ensured that precisely the measuring field generated by the measurement sensor forms a correct and constant distance from the surface of the belt that is to be sensed.

In a further development of the invention it is provided that on the bottom surface of the housing of the vibration sensor, a position marking on the housing side is located, which allows the region on the bottom surface of the housing of the vibration sensor, in which the measuring head of the Doppler radar is located, to be optically detected.

This optically detectable position marking on the housing side is in alignment with the measuring head provided on the inside in the housing, and the optical positioning aid according to the invention with the two LEDs and the two light beams intersecting in the measurement plane will then be in accurate alignment in the region of the measurement field emitted onto the belt surface by the measuring head.

Thus, the optical positioning aid according to the invention is used to adjust the position and the distance of the measuring head above the measuring field.

Since the two light beams of the LEDs are directed forward at an angle in the direction of the measuring head provided at the front and centrally against the surface of the belt, it is thus ensured that also the horizontal inclination of the housing of the vibration sensor is oriented parallel to the surface of the belt, if at the correct distance of the measuring head from the surface of the belt, the two light beams combine on a vertical line directly below the measuring head on the belt surface.

In a further development of the present invention it is provided that the vibration sensor of the Doppler radar module forms a spatially combined single measuring head with the acceleration sensor, i.e. the two sensors are combined in a single approximately punctiform or circular measurement point.

What is important is that the acceleration sensor by itself, without the use of the Doppler radar module, is used as measuring sensor for low frequencies. This means that at a vibration frequency of less than 6 hertz, the vibration sensor is now no Longer held at a certain distance from the measurement object (surface of the belt) while a contactless measurement to the surface of the vibrating belt is carried out, but instead, the vibration sensor is directly mechanically coupled with the surface of the belt. To this end, a spring clip or another suitable mechanical coupling member is used.

The housing of the vibration sensor is clipped onto the belt surface by means of a (mechanical) clip. The belt is set into vibration using a suitable instrument, e.g. it is pulled by hand or struck using a suitable tool, and the acceleration sensor now measures the vibration of the belt directly via the mechanical coupling between the vibration sensor and the mechanical coupling with the belt, without the Doppler radar module being evaluated.

The Doppler radar module is accordingly switched off when the vibration sensor is directly mechanically coupled with the belt and a direct mechanical coupling of the vibration sensor with the belt is carried out at a frequency of less than 6 hertz.

Such vibration frequencies on belts of less than 6 hertz are to be expected above all in the case of very long and heavy belts, in particular V-belts, and in order to improve the measurement for such heavy and long belts, a direct mechanical coupling between the vibration sensor and the belt is provided. The vibration measurement is then carried out only via the acceleration sensor, the Doppler radar module is switched off in the case of such a direct mechanical coupling of the vibration sensor with a belt.

The invention is not limited to detecting the frequency of a V-belt. Also any other belts may be used, in particular drive belts for driving any machines and objects.

The subject matter of the present invention not only results from the subject matter of the individual patent claims, but also from a combination of the individual patent claims with each other.

In as far as any subject matter is referred to a "essential to the invention" or "important," this does not mean that this subject matter does by necessity have to form the subject matter of an independent claim. This is solely determined by the respectively applicable version of the independent patent claim.

All the information and the features disclosed in the document, including the abstract, in particular the three-dimensional illustration shown in the figures, are claimed as being essential to the invention in as far as they are novel over the prior art either individually or in combination.

The invention will be explained in more detail below by means of figures showing a mode of implementation. In this respect, further features that are essential to the invention and advantages of the invention will result from the drawings and the description thereof, wherein:

FIG. 3a shows an interference level of the acceleration sensor—digital;

FIG. 3b shows an interference level of the acceleration sensor—analogue;

FIG. 4a shows the digital signal of the Doppler radar with signal fading in frequency scheme 2;

FIG. 4b shows the level of the Doppler radar digitally in frequency scheme 2;

FIG. 4c shows the level of the Doppler radar in frequency scheme 1;

FIG. 5a shows the level of the Doppler radar, analogue, in frequency scheme 1;

Figure 1:
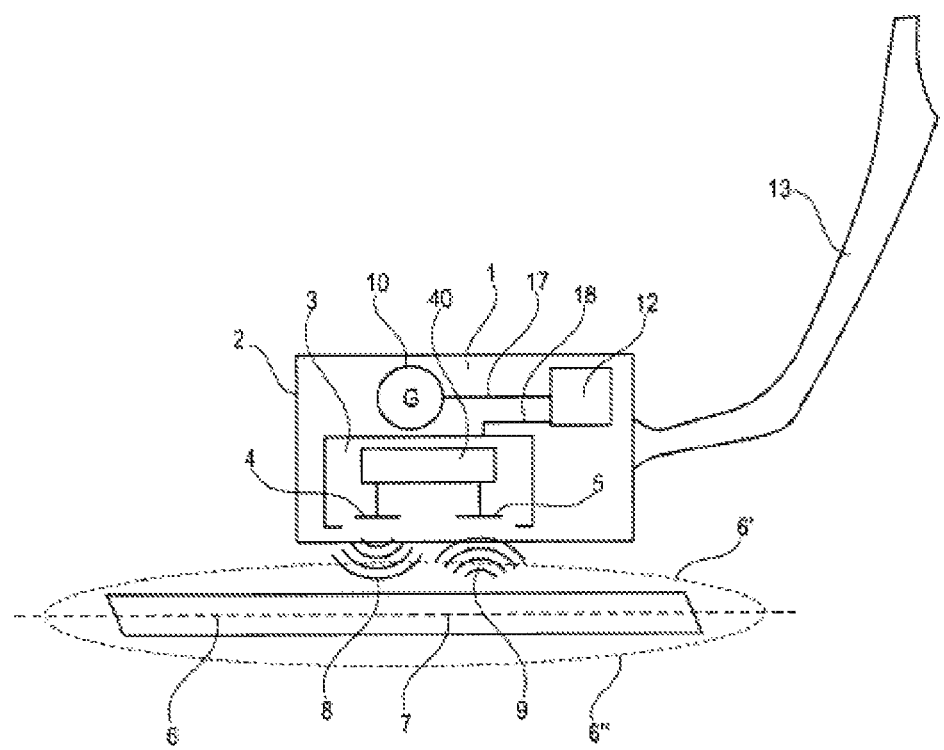
FIG. 1 shows a diagram of an assembly of a hand-held vibration sensor for carrying out vibration measurements on a tight drive belt.

FIG. 1 generally shows a vibration sensor 1 disposed in a housing 2. The housing has approximate dimensions of 50×35×15 mm. It is placed with one of its flat sides in a position opposite a standing belt 6 that is characterized by a central axis through the longitudinal direction 7.

For carrying out vibration measurements, the belt 6 is tightened by hand and is released, so that it vibrates between the positions 6' and 6".

During this time, the housing 2 of the vibration sensor 1 is held by hand at a certain distance from the vibrating frame 6, without the belt 6' knocking against the lateral wall of the housing 2.

During this measurement time it is now possible for undesired vibrations to be generated by movements of the vibration sensor or for the housing 2 to be tilted or to be inadvertently moved away or displaced from the belt 6. For this purpose, the invention provides for an acceleration sensor 10 to be additionally provided in the housing 2 of the vibration sensor 1 next to the Doppler radar module 3.

Figure 2:
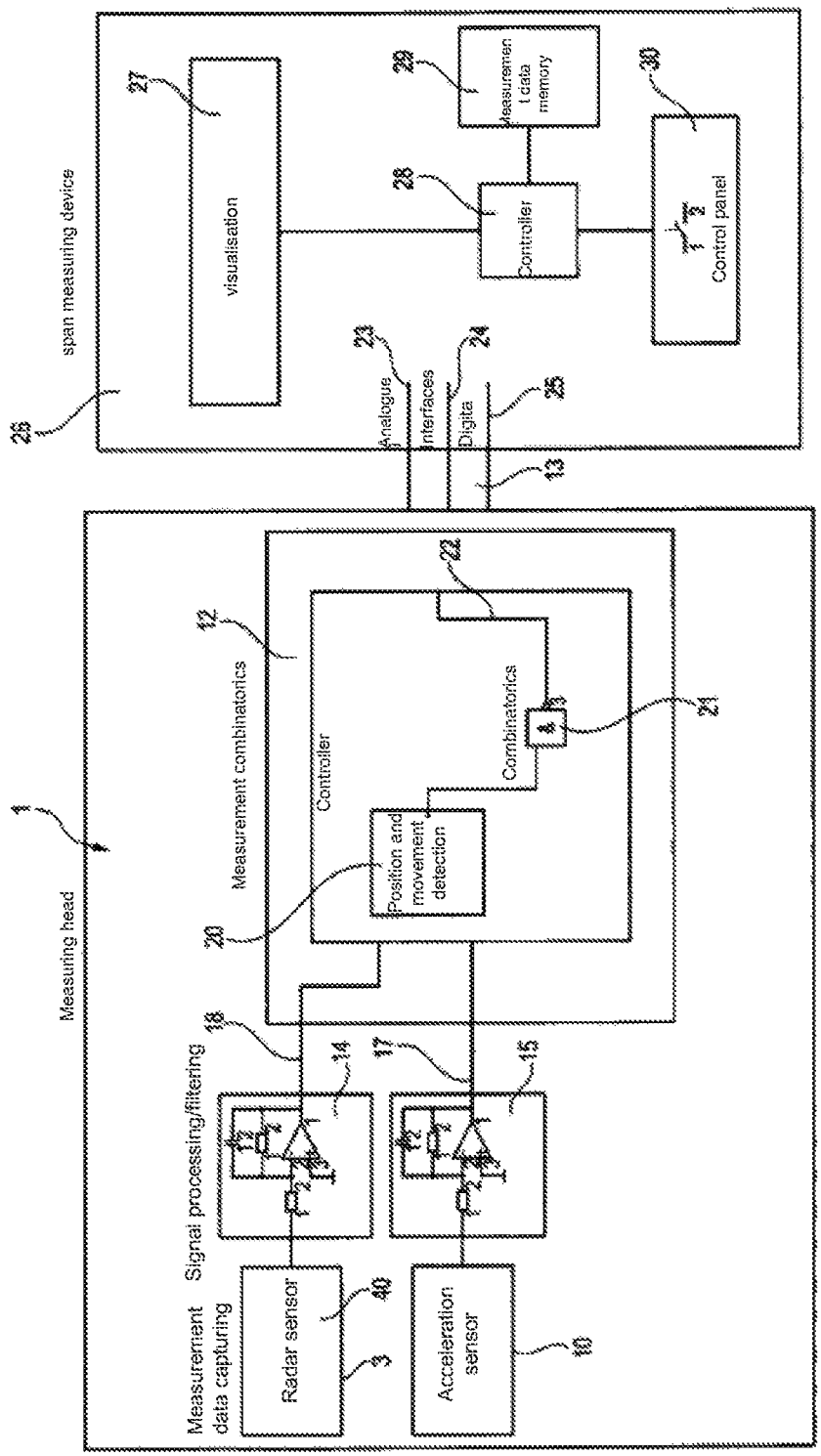
FIG. 2 illustrates the measuring head and the measurement device by way of a block diagram.

The Doppler radar module 3 operates in a manner per se known with a transmit antenna 4 that emits a transmit beam 8 in the microwave range against the vibrating belt 6 and receives the receive beam 9 using a receive antenna 5 and evaluates it according to the Doppler radar principle. To this end, an evaluation module 40 is additionally provided in the housing of the Doppler radar module 3, which evaluates the two beams 8, 9 of the antennae 4, 5 according to the Doppler principle. The output signal is fed to a microprocessor 12 along a line 18 via an amplifier unit 14 with an associated filter (see FIG. 2).

In the housing 2 of the vibration sensor 1, the acceleration sensor 10 is located, the signal of which is fed to the microprocessor 12 along the line 17 via an amplifier unit 15 and a filter circuit.

The microprocessor 12 has integrated therein a software module for position and movement detection of the vibration sensor 1. The particularities of this software module 20 will be explained below with reference to the later figures.

The various evaluations of the microprocessor 12 are fed to a measurement device 26 via the signal cable 13. The feeding of the signals is preferably carried out in a digital form, namely on the one hand via an interface bus 24 and on the other hand, or optionally, along one or more digital lines 25.

In addition, one or more analogue lines 23 may also be provided.

What is important is that also a computation circuit 21 is provided in the microprocessor 12, which computation circuit carries out, according to the later drawings of FIGS. 3 to 6, an evaluation of the position and movement detection of the vibration sensor 1.

This means the output 22 is a signal bus that is supplied to the measurement device 26 as the signal cable 13.

The measurement device 26 (span measuring device) essentially consists of controller 28 that is associated with a measurement data memory 29. The controller is driven by means of a control panel 30, and the sensed measurement values are displayed on a digital display 27.

It is further added that in the housing 2 of the vibration sensor 1, also a contactless temperature measurement unit may be provided, which senses the temperature of the belt 6, in order to distinguish between a belt that is slack as a result of temperature increase and a cool belt. Such a temperature signal sensed in a contactless manner is also fed into the microprocessor 12.

Figure 3:
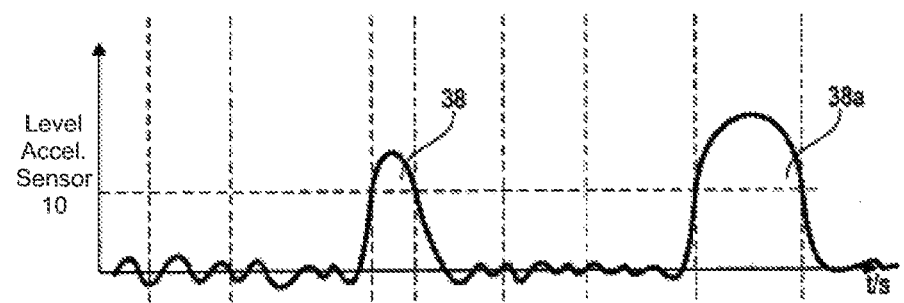
FIG. 3 shows the digital level of the acceleration sensor when interferences are generated.
Figure 4:
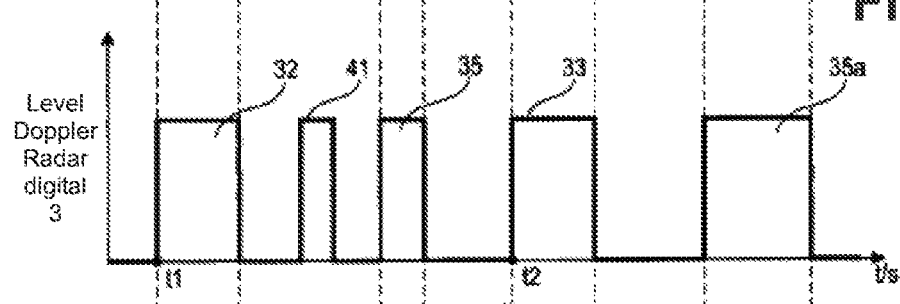
FIG. 4 shows the digital signal of the Doppler radar module.
Figure 5:
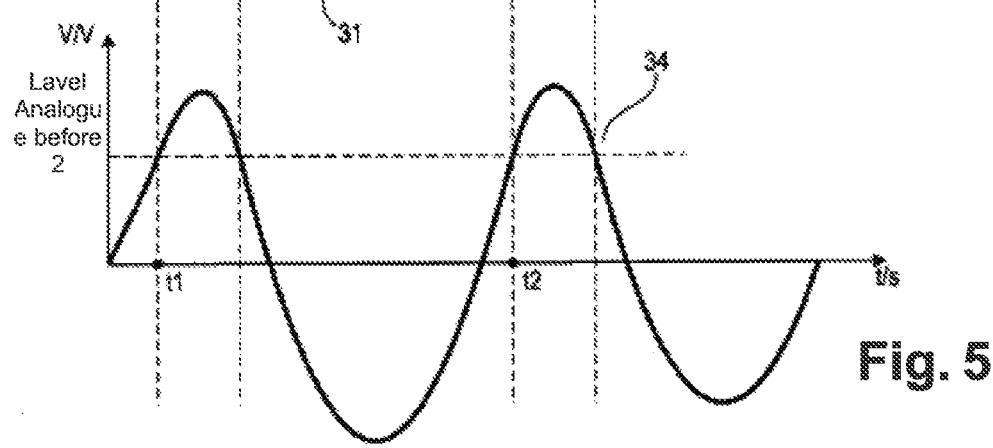
FIG. 5 shows the analogue level of the Doppler radar module.

FIGS. 3 to 5 show the various evaluations, so that according to the invention a particularly fault-free evaluation of the Doppler radar signal can be carried out.

FIG. 5 initially shows that the analogue level of the Doppler radar can be presented as an analogue vibration curve, and here a switching threshold 34 is defined, which when exceeded generates a digital impulse as shown in FIG. 4.

This means, if the switching threshold 34 is exceeded at each of the times t1 and t2, a digital pulse with a pulse amplitude 32 and 33 is formed therefrom.

The distance between the two times t1 and t2 is defined as the time difference 31 and indicates the frequency of the vibrating belt. Thus, the frequency is f=1/time difference 31.

If an unwanted movement of the measuring head occurs during the vibration measurement, the acceleration sensor 10 generates an analogue signal that is shown as signal 38 in FIG. 3.

If during the evaluation of the curve according to FIG. 4 it is determined that at the time of the generation of a pulse 38 of the acceleration sensor 10, at the same time also a pulse 35 of the Doppler radar is generated, then this is disregarded as a faulty impulse 35 of the Doppler radar.

The measurement of the time 31 is defined with the rising or falling edge at the time t1 of the pulse 32 and also with the rising or falling edge at the time t2 of the pulse 33.

What is important with the method according to the invention is therefore on the one hand the weighting of the measurement results of the Doppler radar module as a function of the acceleration signal, and further it is also claimed as being essential that in addition, an assessment of the vibration measurement as a function of the temperature of the belt is carried out.

What is further of importance in the method is that a weighting is carried out also in relation to the sensed level of the acceleration sensor. An unwanted acceleration of the hand-held vibration sensor beyond a predetermined acceleration value causes the Doppler radar signal generated during this period of time not to be evaluated.

Figure 6:
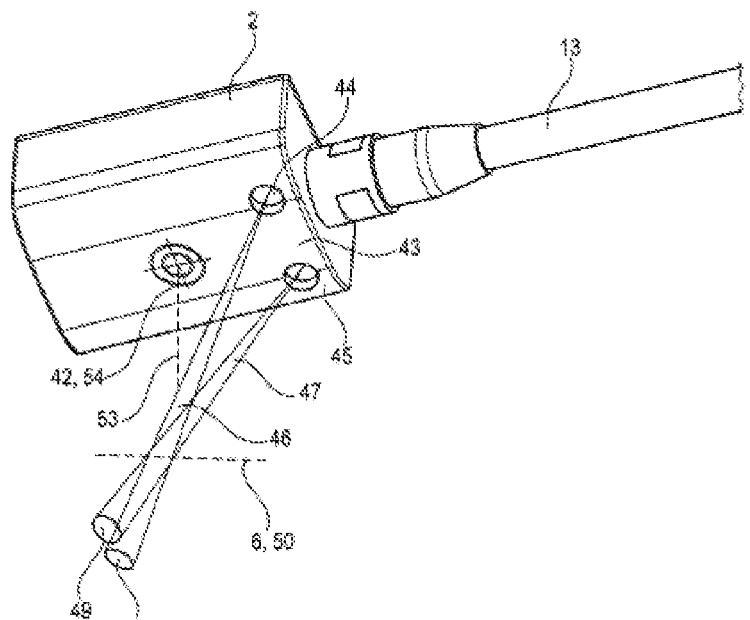
FIG. 6 shows the perspective bottom view of a vibration sensor with an integrated optical positioning aid.

FIG. 6 shows an optical positioning aid 43 for the correct distance adjustment of the housing 2 of the vibration sensor 1 over a measurement plane that is formed by the surface of the belt 6. At the same time, FIG. 6 shows a position marking 42 that is attached to the housing and can be perceived with the naked eye, which is supposed to make it optically noticeable to the user on the bottom surface of the housing 2 that in this lace, the measuring head 54 is installed in the housing 2.

The optical positioning aid 43 consists of two LEDs 44, 45 provided at a mutual distance from each other, of which each LED 44, 45 generates a light beam 46, 47 that is projected onto the surface of the belt 6.

In each light beam 46, 47, additional central marking points 48, 49 are projected onto the surface of the belt 6.

Figure 7:
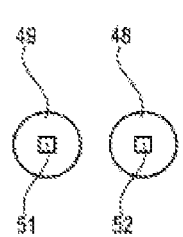
FIG. 7 shows a diagram of the two light beams of the positioning aid which are generated by the LEDs.

FIG. 7 shows an incorrect distance from the bottom surface of the housing 2 to the measurement plane, namely in the case in which neither the two light beams 46, 47 nor the luminous markings 51, 52 overlap on the surface of the belt 6.

Accordingly, the two light beams 46, 47 form marking points 48, 49 on the measuring plane that can be optically detected by the user, e.g. on the surface of the belt 6 to be detected, and as a function of the color of the LED, such a marking point illuminates e.g. in red or in any other desired color on the surface.

In the central region of the marking points 48, 49 projected onto the measurement plane, the smaller luminous markings 51, 52 are provided, which illuminate more intensely than the environment of the marking points 48, 49 and can adopt any desired symbol shape, such as e.g. a triangle, a rectangle or the like.

Figure 8:
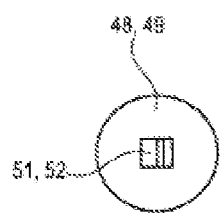
FIG. 8 shows the same illustration as FIG. 7, where the two light beams of the LEDs intersect on a measurement plane, so that the correct distance from the measurement plane is achieved.

Once the exact distance according to FIG. 6 between the bottom surface of the measuring head 54 in the housing 2 and the surface of the belt 6 to be detected has been adjusted by hand, a level of overlap 50 is achieved, in which the two light beams 46, 47 according to FIG. 8 are superimposed and the two luminous markings 51, 52 combine with each other. The level of overlap 50 is identical with the surface of the belt 6.

This means, the correct distance of the measuring head 54 from the belt surface has been reached as soon as the two light beams and the luminous markings centrically located therein according to FIG. 5 combine on the belt surface to form a single luminous symbol according to FIG. 6.

The two light beams 46, 47 are directed forward at an angle, so that the level of overlap 50 thereof intersects on a vertical line in the region of the measuring field 53 of the measuring head 54. In this way it will always be ensured that the optical distance measurement is carried out by means of the optical positioning aid 43, exactly in the measuring field 53, 54 of the measuring head 54, and any tilting or inadmissible inclination of the housing 2 of the vibration sensor 1 will be reliably detected.

If a signal of the movement sensor is detected, the two LEDs of the position detector are switched off. As a result, any inadmissible movement is optically signaled.

FIG. 5*a* shows the analogue level of the Doppler radar signal.

In the right-hand window at the bottom in the drawing according to FIG. 5*a*, the incomplete vibration profile of a belt stop is shown in an analogue (bottom curve) and a digital (top curve) form. The bottom curve in the small window corresponds to FIG. 5*a* on an enlarged scale, namely as a cut-out from the window of the small figure, and the illustration above it is the digitized form of this level corresponding to FIG. 4*c*.

Both figure profiles in the small window of the illustration at the bottom right are shown in FIGS. 4*c* and 5*a* lying on top of each other.

The dashed lines in FIG. 5*a* indicate the switching threshold, and as an example of such a switching threshold, a distance between the times t1 and t2 is shown.

The horizontal arrow indicates the time distance between the two times t1 and t2.

The time distance resulting therefrom is identified with the reference numeral 31. The switching threshold at the top is provided with the reference numeral 34.

From FIG. 4*c*, the digital Doppler radar signal determined from FIG. 5*a* results, and reference numerals 32, 33 show the pulse amplitude.

Thus, the frequency of the Doppler radar signal is calculated from the time difference 31.

In principle, the illustration in FIGS. 4*c* and 5*a* corresponds to the derivation shown in FIGS. 3 and 4.

FIGS. 4*b*, 3*b*, FIG. 3*a* and FIG. 4*a* show a frequency scheme 2.

FIG. 4*b* shows the digital Doppler radar signal corresponding to the illustration in FIG. 4*c*, however in a narrower illustration distance, wherein two pulse amplitudes 32, 33 are shown lying next to each other.

The interference level according to FIG. 3*b* of an acceleration sensor is shown superimposed onto the digital Doppler radar signal according to FIG. 4*b*.

The complete interference level is referred to with 38 in FIG. 3*b*.

In FIG. 3*a* below, the same interference level as in FIG. 3*b* is shown in a digitized form and it can be seen that if the interference level after pulse 38 exceeds a certain value in three spatial axes, digital interference level signal corresponding to the error impulse 35 in FIG. 3*a* is generated.

As soon as the digital interference level according to FIG. 3*a* corresponding to the error pulse 35 is present, the digital Doppler radar signal shown above in FIG. 4*b* is faded out in correspondence with FIG. 4*a*. Accordingly, it will not be used for the evaluation.

Thus, the advantage is achieved that the acceleration sensor generates an interference level that is digitized, and since the acceleration sensor as a rule detects only slow hand movements during the guiding of the sensor, a complete window according to FIG. 4*a* will always be generated. The window length of the error impulse 35 in FIG. 3*a* therefore leads to a fading out of the level of the Doppler radar, e.g. within a period of time of 200 ms.

It follows from this that a detection of the signal is not impaired by this fading out because the fading out time is very brief and has no negative effect on the accuracy of the measurement.

FIGURE LEGENDS

1 Vibration sensor
2 Housing
3 Doppler radar module
4 Transmit antenna
5 Receive antenna
6 Belts 6', 6"
7 Longitudinal axis
8 Transmit beam
9 Receive beam
10 Acceleration sensor
11
12 Microprocessor
13 Signal cable
14 Amplifier unit
15 Amplifier unit
16 Amplifier unit
17 Line (from 10)
18 Line (from
19
20 Module
20 Computation circuit
22 Output
23 Analogue line
24 Interface bus
25 Digital line
26 Measurement device
27 Display
28 Controller
29 Measurement data memory
30 Control panel
31 Time difference
32 Pulse amplitude 1
33 Pulse amplitude 2
34 Switching threshold
35 Digital output pulse acceleration sensor
38 Analogue signal acceleration signal 38 (from 10)
40 Evaluation module
42 Position marking
43 Optical positioning aid
44 LED 1
45 LED 2
46 Light beam 1
47 Light beam 2
48 Marking point 1
49 Marking point 2
50 Level of overlap
51 Luminous marking 1
52 Luminous marking 2
53 Measuring field
54 Measuring head

The invention claimed is:

1. A device for the hand-held measurement of vibration frequencies on a tight drive belt with a Doppler radar module that transmits a transmit beam using a transmit antenna against a vibrating surface of the drive belt and receives, using a receive antenna, a receive beam reflected from the surface and evaluates the receive beam according to the Doppler principle, wherein in the device apart from the Doppler radar module an acceleration sensor is additionally provided that produces pulses upon acceleration so that if a pulse of the Doppler radar is detected and at the same time a pulse of the acceleration sensor is detected, the pulse of the Doppler radar is disregarded as a faulty impulse.

2. The device as claimed in claim 1, wherein in a housing of the device, the acceleration sensor is provided, a signal of which acceleration sensor can be fed to a microprocessor via an amplifier unit and a filter circuit, which microprocessor combines a signal of the Doppler radar with the signal of the acceleration sensor so that some signals may be disregarded.

3. The device as claimed in claim 1, wherein an optical positioning aid for the hand-held positioning of the device above the vibrating surface of a belt s provided on the bottom surface of a housing of the device.

4. The device as claimed in claim 3, wherein the optical positioning aid consists of two LEDs located at a distance from each other in a housing of the device, which LEDs each generate a light beam directed downwards and forwards at an angle against the surface of the belt to be detected.

5. The device as claimed in claim 4, wherein together with the light beams of the two LEDs, marking points that are central to these light beams can be projected onto the surface of the belt.

6. A method for operating a hand-held device for carrying out a vibration frequency measurement on a tight and vibrating drive belt with a Doppler radar module that transmits, using a transmit antenna, a transmit beam against a vibrating surface of the tight a vibrating drive belt and receives, using a receive antenna, a receive beam reflected from the surface and evaluates the receive beam according to the Doppler principle, wherein from an analogue level of the Doppler radar module, by using a switching threshold, digital pulses that are temporally offset relative to each other are derived, the mutual time distance of which is a measure of the time of the pulses, and from this the frequency of the tight and vibrating drive belt is derived, provided that an acceleration sensor that generates levels upon acceleration does not generate a level that coincides with one of the pulses of the Doppler radar module, and thus the pulse of the Doppler radar sensor is disregarded because the hand-held device was briefly moved during the measurement.

7. The method as claimed in claim 6, wherein in the case of belt-side vibration frequencies below a threshold of 6 hertz, the Doppler radar module is switched off and the belt-side vibration frequency is realized only via the evaluation of signals of the acceleration sensor, if this is directly mechanically connected to the belt.

8. The method as claimed in claim 6, wherein an optical positioning aid for the hand-held positioning of the hand-held device above the vibrating surface of the belt is provided.

9. The method as claimed in claim 8, wherein the optical positioning aid consists of two LEDs provided on the bottom surface of the housing, each of which LEDs projects a light beam onto the surface of the belt and the two light beams overlap with each other on the surface of the belt to be detected, if the correct distance between a position marking on the bottom surface of the housing and the belt has been adjusted by hand.

* * * * *